United States Patent [19]
Sano et al.

[11] Patent Number: 5,948,862
[45] Date of Patent: Sep. 7, 1999

[54] MULTI-PIECE SOLID GOLF BALL

[75] Inventors: Yoshinori Sano; Keiji Moriyama, both of Shirakawa, Japan

[73] Assignee: Sumitomo Rubber Industries, Ltd., Hyogo-ken, Japan

[21] Appl. No.: 08/992,910

[22] Filed: Dec. 18, 1997

[30] Foreign Application Priority Data

Dec. 18, 1996 [JP] Japan ................................ 8-354440

[51] Int. Cl.⁶ ............................ A63B 37/00; A63B 37/12
[52] U.S. Cl. ............................ 525/89; 525/93; 473/373; 473/374
[58] Field of Search ................... 525/89, 93; 473/373, 473/374

[56] References Cited

U.S. PATENT DOCUMENTS

| | | |
|---|---|---|
| 5,253,871 | 10/1993 | Viollaz . |
| 5,314,187 | 5/1994 | Proudfit . |
| 5,439,227 | 8/1995 | Egashira et al. . |
| 5,693,711 | 12/1997 | Akiba ...................................... 473/385 |
| 5,848,943 | 12/1998 | Sano ........................................ 473/385 |

FOREIGN PATENT DOCUMENTS

| | | |
|---|---|---|
| 025984 | 1/1995 | Japan . |
| 2296497 | 7/1996 | United Kingdom . |
| 2311529 | 10/1997 | United Kingdom . |
| WO9316764A1 | 9/1993 | WIPO . |

*Primary Examiner*—David Buttner

[57] ABSTRACT

The present invention provides a multi-piece solid golf ball having good shot feel, while keeping the characteristics inherent to the solid golf ball, i.e. excellent flight performance. The present invention related to a multi-piece solid golf ball comprising a core, one or more intermediate layers formed on the core, and a cover covering the intermediate layer, wherein at least one of the intermediate layer is mainly composed of a heated mixture comprising at least two materials selected from the following three materials:

(A) ionomer resin, (B) thermoplastic elastomer having terminal OH groups, and (C) either epoxy-group containing styrene-butadiene-styrene block copolymer or epoxy-group containing styrene-isoprene-styrene block copolymer, and the intermediate layer has a JIS-C hardness of 40 to 80, and the core has a JIS-C hardness difference ranging from its center to the surface of not more than 15.

2 Claims, 1 Drawing Sheet

MULTI-PIECE SOLID GOLF BALL

FIELD OF THE INVENTION

The present invention relates to a multi-piece solid golf ball. More particularly, it relates to a multi-piece solid golf ball comprising a core, at least one intermediate layer formed on the core, and a cover covering the intermediate layer.

BACKGROUND OF THE INVENTION

Hitherto, solid golf balls, such as two-piece solid golf ball comprising a core and a cover covering the core, and three-piece solid golf ball comprising a two-layer structured core or a cover covering the core, have been, commercially sold.

In the solid golf balls, the core is formed from a vulcanized molded rubber composition containing polybutadiene as a base rubber. It is also known that the rubber composition additionally contains a monomer having unsaturated bond, such as a metal salt of $\alpha,\beta$-unsaturated carboxylic acid (such as zinc acrylate, zinc methacrylate, etc.) as co-crosslinking agent and peroxides as crosslinking agent, so as to increase the coefficient of restitution and impact resilience of the core.

The vulcanized molded rubber composition of the above mentioned rubber formulation system provides the core with suitable hardness and excellent durability because of the formation of three-dimensional structure, which is most generally employed as the core rubber composition for solid golf balls.

Recently, in order to provide a two-piece solid golf ball having shot feel as good as thread wound golf balls, a soft type two-piece solid golf ball using a soft core has been proposed.

However, the use of the soft core adversely affects on rebound characteristics, and results in the reduction of flight distance and the deterioration of durability.

Then, it has also been proposed that an intermediate layer is placed between the core and the cover of the two-piece solid golf ball to keep balance between flight performance and shot feel at the time of hitting.

For example, Japanese Patent Kokai Publication No. 244174/1992 proposes the use of a mixture of a block copolymer of amides and an ionomer resin as the intermediate layer. The resulting golf ball has high hardness, but has poor rebound characteristics.

Japanese Patent Kokai Publication No. 218078/1994 proposes that the intermediate layer is made from an ionomer resin and the cover is formed from a soft elastomer, such as rubber or balata. However, the use of ionomer resin in the intermediate layer makes the shot feel of the resulting golf ball poorer.

Japanese Patent Kokai Publication No. 142228/1994 proposes the use of a mixture of a polyether-ester thermoplastic elastomer and an ethylene-(meth)acrylic acid copolymer ionomer resin as the intermediate layer. However, the shot feel and rebound characteristics of the resulting golf ball are not sufficiently improved by the proposal.

OBJECTS OF THE INVENTION

A main object of the present invention is to provide a multi-piece solid golf ball having good shot feel, while keeping the characteristics inherent to the solid golf ball, i.e. excellent flight performance.

According to the present invention, the object described above has been accomplished by placing at least one intermediate layer mainly composed of a heated mixture comprising at least two selected from the group consisting of ionomer resin, thermoplastic elastomer having terminal OH groups, and epoxy-group containing styrene-butadiene-styrene block copolymer or epoxy-group containing styrene-isoprene-styrene block copolymer, between a core and a cover, thereby providing a multi-piece solid golf ball having excellent flight performance and good shot feel.

This object as well as other objects and advantages of the present invention will become apparent to those skilled in the art from the following skilled in the art from the following description with reference to the accompanying drawings.

SUMMARY OF THE INVENTION

Figure 1:
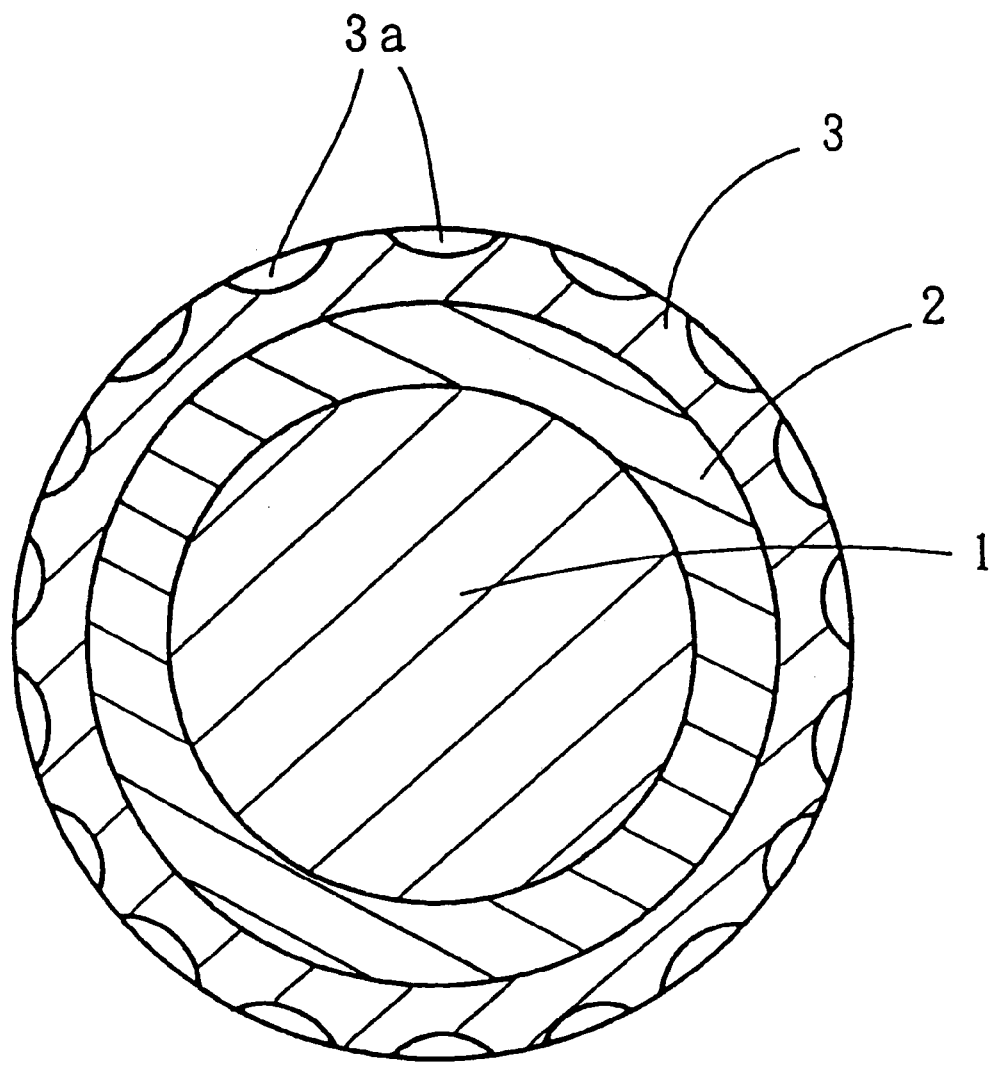
FIG. 1 is a schematic cross section illustrating one embodiment of the golf ball of the present invention.

The present invention provides a multi-piece solid golf ball comprising a core, one or more intermediate layers formed on the core, and a cover covering the intermediate layer, wherein at least one of the intermediate layer is mainly composed of a heated mixture comprising at least two materials selected from the following three materials:

(A) ionomer resin, (B) thermoplastic elastomer having terminal OH groups, and (C) either epoxy-group containing styrene-butadiene-styrene block copolymer or epoxy-group containing styrene-isoprene-styrene block copolymer, and the intermediate layer has a JIS-C hardness of 40 to 80, and the core has a JIS-C hardness difference ranging from its center to the surface of not more than 15.

In the golf ball of the present invention, the intermediate layer is mainly composed of a heated mixture containing at least two of the above three components in order to impart good shot feel to the resulting golf ball while maintaining excellent flight performance, and the intermediate layer has a JIS-C hardness of 40 to 80 in order to impart good shot feel and excellent flight distance to the resulting golf ball, and the core has a JIS-C hardness difference ranging from its center to the surface of not more than 15 in order to give excellent flight performance to the resulting golf ball.

DETAILED DESCRIPTION OF THE INVENTION

In the golf ball of the present invention, the intermediate layer is mainly composed of a heated mixture of at least two materials selected from the group consisting of (A)ionomer resin, (B)thermoplastic elastomer having terminal OH groups, and (C)either epoxy-group containing styrene-butadiene-styrene block copolymer or epoxy-group containing styrene-isoprene-styrene block copolymer. The ionomer resin, thermoplastic elastomer having terminal OH groups, or epoxy-group containing styrene-butadiene-styrene block copolymer or epoxy-group containing styrene-isoprene-styrene block copolymer will be explained hereinafter.

Examples of the ionomer resin include a copolymer of ethylene and acrylic acid or methacrylic acid, of which a portion of the acid groups is neutralized with metal ion, or a terpolymer of ethylene, acrylic acid or methacrylic acid and acrylic acid ester or methacrylic acid ester, of which a portion of the acid groups is neutralized with metal ion. The neutralizing metal ion includes Na, Zn, Mg, Cu, K, Ca, Li and the like.

Examples of the ionomer resin will be shown by a trade name thereof. Examples of the ionomer resin, which is commercially available from Mitsui Du Pont Polychemical Co., include Hi-milan 1605 (Na), Hi-milan 1707 (Na), Hi-milan AM7318 (Na), Hi-milan 1706 (Zn), Hi-milan AM7315 (Zn), Hi-milan AM7317 (Zn), Hi-milan AM7311 (Mg) and Hi-milan MK7320 (K); and Hi-milan 1856 (Na), Hi-milan 1855 (Zn) and Hi-milan AM7316 (Zn) as the terpolymer ionomer resin. Examples of the ionomer resin, which is commercially available from Du Pont U.S.A., include Surlyn 8920 (Na), Surlyn 8940 (Na), Surlyn AD8512 (Na), Surlyn 9910 (Zn), Surlyn AD8511 (Zn), Surlyn 7930 (Li) and Surlyn 7940 (Li); and Surlyn AD8265 (Na) and Surlyn AD8269 (Na) as the terpolymer ionomer resin. Examples of the ionomer resin, which is commercially available from Exxon Chemical Co., include Iotek 7010 (Zn) and Iotek 8000 (Na). These ionomer resins are used alone or in combination thereof. Incidentally, Na, Zn, K, Li and Mg, which are described in parentheses after the trade name of the above ionomer resin, indicate their neutralizing metal ion species.

Examples of the thermoplastic elastomers having terminal OH groups include, hydrogenated styrene-isoprene-styrene block copolymers having terminal OH groups, Which are commercially available from Kuraray Co., Ltd. under the trade name of "HG-252".

Examples of the epoxy-group containing styrene-butadiene-styrene block copolymer or epoxy-group containing styrene-isoprene-styrene block copolymer include SBS structured block copolymer having polybutadiene block with epoxy groups, which are commercially available from Daicel Chemical Industries, Ltd. under the trade name of "Epofriend AT014", "Epofriend AT015", "Epofriend AT000" and the like; and SBS structured copolymer having polybutadiene block with epoxy group, which is then hydrogenated, commercially available from Daicel Chemical Industries, Ltd. under the trade name of "Epofriend AT018", "Epofriend AT019" and the like. In this context, the term "SBS structure" means polystyrene-polybutadiene-polystyrene structure in which polybutadiene block is sandwiched by two polystyrene blocks.

When the ionomer resin, thermoplastic elastomer having terminal OH groups, and epoxy-group containing styrene-butadiene-styrene block copolymer or epoxy-group containing styrene-isoprene-styrene block copolymer are respectively represented by (A), (B) and (C), it is preferable that the heated mixture of the three comprises 20 to 50% by weight of (A), 40 to 70% by weight of (B) and 10 to 40% by weight of (C).

In the heated mixture of (A), (B) and (C), when an amount of (A) is less than 20% by weight, a hardness of the heated mixture is lower than the desired value to degrade rebound characteristics. On the other hand, when an amount of (A) is more than 50% by weight, a hardness of the heated mixture is higher than the desired value to degrade shot feel. When an amount of (B) is less than 40% by weight, the number of OH groups reduces, and the reactivity of the OH groups with epoxy groups in (C) reduces. Therefore, proper dispersibility is not obtained to result in poor durability. On the other hand, when an amount of (B) is more than 70% by weight, a hardness of the heated mixture is lower than the desired value to degrade rebound characteristics. When an amount of (C) is less than 10% by weight, the number of epoxy groups reduces, and the reactivity of the epoxy group with OH group in (B) reduces. Therefore, proper dispersibility is not obtained to result in poor durability. On the other hand, when an amount of (C) is more than 40% by weight, the number of epoxy groups increases, and the reactivity of the epoxy group with OH group in (B) excessively increases. Therefore, a hardness of the heated mixture is higher than the desired value to degrade shot feel.

When the heated mixture comprising two selected from the group consisting of (A), (B) and (C) is used, combinations, that is the heated mixture of (A) and (B), the heated mixture of (A) and (C), and the heated mixture of (B) and (C) are exemplified. It is preferable that the heated mixture of (A) and (B) comprises 20 to 75% by weight of (A) and 25 to 80% by weight of (B). It is preferable that the heated mixture of (A) and (C) comprises 30 to 90% by weight of (A) and 10 to 70% by weight of (C). It is preferable that the heated mixture of (B) and (C) comprises 50 to 80% by weight of (B) and 20 to 50% by weight of (C).

In the heated mixture of (A) and (B), when an amount of (A) is less than 20% by weight, a hardness of the heated mixture is lower than the desired value to degrade rebound characteristics. On the other hand, when an amount of (A) is more than 75% by weight, an mount of (B) reduces, and a hardness of the heated mixture is higher than the desired value to degrade shot feel.

In the heated mixture of (A) and (C), when an amount of (A) is less than 30% by weight, a hardness of the heated mixture is lower than the desired value to degrade rebound characteristics. On the other hand, when an amount of (A) is more than 90% by weight, an mount of (C) reduces, and thus a hardness of the heated mixture is higher than the desired value to degrade shot feel.

In the heated mixture of (B) and (C), when an amount of (B) is less than 50% by weight, the number of OH group reduces, and thus unreacted epoxy groups in (C) remain. Therefore, the desired hardness is not obtained. On the other hand, when an amount of (B) is more than 80% by weight, an amount of (C) reduces, and the reactivity of the epoxy group in (C) with OH group in (B) reduces because of the reduction of the number of epoxy groups. Therefore, the desired hardness is not obtained.

In the golf ball of the present invention, the intermediate layer is mainly composed of a heated mixture comprising at least two materials selected from the following three, i.e. (A)ionomer resin, (B)thermoplastic elastomer having terminal OH groups, and (C)either epoxy-group containing styrene-butadiene-styrene block copolymer or epoxy-group containing styrene-isoprene-styrene block copolymer, but the term "mainly" means that the intermediate layer may be formed from the heated mixture of the above two or three materials, or may contain weight adjustor, antioxidant and the like other than the heated mixture.

In the golf ball of the present invention, it is required that the intermediate layer has a JIS-C hardness of 40 to 80. When the JIS-C hardness of the intermediate layer is lower than 40, shot feel is softer, but rebound characteristics are degraded, and thus the desired flight performance is not obtained. On the other hand, when the JIS-C hardness is higher than 80, shot feel is degraded. The JIS-C hardness of the intermediate layer is more preferably ranged within 55 to 75.

A thickness of the intermediate layer is preferably 1 to 4 mm, more preferably 1.3 to 2.3 mm. When the thickness of the intermediate layer is smaller than 1 mm, shot feel is degraded. On the other hand, when the thickness of the intermediate layer is larger than 4 mm, the resulting golf ball is too hard, and thus rebound characteristics are degraded.

In the present invention, the core is not limited, but may be any of solid cores. The core may be obtained by vulcanizing (crosslinking) or press-molding a rubber composition for core into a spherical form. The rubber composition comprises 10 to 35 parts by weight of a co-crosslinkig agent, for example a metal salt (such as zinc salt, magnesium salt and the like) of α,β-unsaturated carboxylic acid (such as acrylic acid, methacrylic acid and the like), 0.5 to 5 parts by weight of peroxides such as dicumyl peroxide and the like, 0.1 to 1 parts by weight of antioxidants, optionally 0.1 to 5 parts by weight of peptizers, based on 100 parts by weight of polybutadiene. The vulcanization may be conducted, by heating at 140 to 170° C. under pressure for 10 to 45 minutes.

In the golf ball of the present invention, it is required that the core has a JIS-C hardness difference ranging from the center point to the surface of not more than 15. When the JIS-C hardness difference ranging from the center point to the surface of the core is not more than 15, energy loss from the deformation of the resulting golf ball, when hitting, is small, and thus the golf ball has good rebound characteristics. On the other hand, when the JIS-C hardness difference is larger than 15, shot feel is soft, but energy loss is large. Therefore, rebound characteristics are degraded, and durability is degraded.

A diameter of the core is preferably 32 to 38 mm. When the diameter of the core is within the range of 32 to 38 mm, a thickness of the intermediate layer and cover can be adjusted to a suitable thickness, and thus good rebound characteristics, good shot feel, excellent durability and the like can be obtained. When the diameter of the core is smaller than 32 mm, the thickness of the intermediate layer or the cover is large, and thus shot feel and rebound characteristics are degraded. On the other hand, when the diameter of the core is larger than 38 mm, the thickness of the intermediate layer or the cover is small, and thus durability is degraded.

The cover used in the present invention is formed from a cover composition mainly comprising ionomer resin. Examples of the ionomer resin include the above ionomer resins for the intermediate layer.

In the present invention, the cover composition may optionally contain various additives such as pigments, dispersants, antioxidants, UV absorbers, photostabilizers and the like, in addition to the ionomer resin.

The multi-piece solid golf ball of the present invention, will be explained with reference to the accompanying drawing.

FIG. 1 is a schematic cross section illustrating one embodiment of the multi-piece solid golf ball of the present invention. In FIG. 1, 1 is a core, 2 is an intermediate layer formed on the core 1 and 3 is a cover covering the intermediate layer 2. Dimples are shown as 3a and provided on the cover 3.

The core 1 is one which is referred as a "solid core" but not limited thereto. The core 1 is a vulcanized molded article of the rubber composition comprising the above polybutadiene as a base rubber. It is required that the core 1 has a JIS-C hardness difference ranging from the center point to the surface of not more than 15. And the core 1 preferably has a diameter of 32 to 38 mm.

It is required that the intermediate layer 2 is mainly composed of a heated mixture comprising at least two materials selected from the three, i.e. (A)ionomer resin, (B)thermoplastic elastomer having terminal OH groups, and (C)either epoxy-group containing styrene-butadiene-styrene block copolymer or epoxy-group containing styrene-isoprene-styrene block copolymer, and has a JIS-C hardness of 40 to 80.

The cover 3 is not limited, but it is preferable that it is mainly formed from ionomer resin.

The dimples 3a are provided optionally or according to the desired characteristics to the cover 2 of golf ball in a suitable number and form, then, paint finishing or marking may be optionally formed on the golf ball.

EXAMPLES

The following Examples and Comparative Examples further illustrate the present invention in detail but are not to be construed to limit the scope of the present invention.

Examples 1 to 4 and Comparative Examples 1 to 3

Multi-piece solid golf balls of Examples 1 to 4 and Comparative Examples 1 to 3 were made by the following steps (i) to (iv). The steps may not always be precisely in order of (i) to (iv), may be simultaneously processed.

(i) Production of Cores

The core compositions A and B shown in Table 1 were prepared, and then vulcanized by press-molding at the conditions described therein to obtain cores having the diameter of 35.3 mm. Amount of each component in Table 1 is represented in parts by weight.

The weight, compression and hardness difference of the resulting cores were determined, and the results are shown in Table 1. The compression was determined by measuring a deformation amount when applying an initial load of 10 Kg to a final load of 130 Kg on the core. The hardness difference was determined by measuring hardness of the center point and the surface of the core with a JIS-C hardness meter, and then calculating the difference between the two hardness values. The hardness of the center point of the core was measured after cutting the core.

TABLE 1

| Core composition | A | B |
|---|---|---|
| Core formulation: | | |
| Polybutadiene *1 | 100 | 100 |
| Zinc acrylate | 29 | 29 |
| Dicumyl peroxide | 2.0 | 1.8 |
| Zinc oxide | 32 | 32 |
| Antioxidant *2 | 0.5 | 0.5 |
| Peptizer *3 | 0.5 | 0.5 |
| Vulcanization condition (° C. × minutes) | 150 × 28 | 160 × 12 |
| Physical properties of core: | | |
| Weight (g) | 28.2 | 28.2 |
| Compression (mm) | 3.51 | 3.84 |
| JIS-C hardness difference | 12 | 20 |

*1 Polybutadiene (trade name "BR-18") from Japan Synthetic Rubber Co., Ltd.
*2 Antioxidant (trade name "Yoshinox 425") from Yoshitomi Pharmaceutical Inds., Ltd.
*3 Peptizer (diphenyl disulfide) from Sumitomo Seika Co., Ltd.

(ii) Preparation of Intermediate Layer Compositions

The intermediate layer compositions shown in Table 2 were mixed using a kneading type twin-screw extruder to obtain pelletized intermediate layer compositions.

The extrusion conditions were a screw revolution per minute of 200 rpm, and a screw L/D of 35. The formulation components were heated at 200 to 260° C. at the die position of the extruder.

TABLE 2

| Intermediate layer compositions | I | II | III | IV | V | VI |
|---|---|---|---|---|---|---|
| Surlyn AD8512 *4 | 10 | 30 | 35 | 0 | 40 | 10 |
| Surlyn AD8511 *5 | 10 | 30 | 35 | 0 | 40 | 10 |
| HG-252 *6 | 60 | 40 | 0 | 70 | 15 | 20 |
| Epofriend AT015 *7 | 20 | 0 | 30 | 30 | 5 | 60 |

*4 Surlyn AD8512 (trade name), ethylene-methacrylic acid copolymer ionomer resin obtained by neutralizing with zinc ion, manufactured by DuPont USA Co., flexural modulus = 2,240 kgf/cm$^2$, Shore D hardness = 60
*5 Surlyn AD8511 (trade name), ethylene-methacrylic acid copolymer ionomer resin obtained by neutralizing with sodium ion, manufactured by DuPont USA Co., flexural modulus = 2,850 kgf/cm$^2$, Shore D hardness = 62
*6 HG-252 (trade name), hydrogenated styrene-isoprene-styrene block copolymer having a terminal OH group, manufactured by Kuraray Co. Ltd., JIS-A hardness = 80, content of styrene = 40% by weight
*7 Epofriend AT015 (trade name), styrene-butadiene-styrene block copolymer with epoxy groups, manufactured by Daicel Chemical Industries, Ltd., JIS-A hardness = 67, styrene/butadiene (weight ratio) = 40/60, content of epoxy = about 1.5–1.7% by weight (iii) Preparation of Cover Composition The cover composition shown in Table 3 was mixed using a kneading type twin-screw extruder to obtain pelletized cover composition. The extrusion conditions were as described in the case of preparation of intermediate layer compositions in the step (ii).

TABLE 3

| Cover composition | parts by weight |
|---|---|
| Hi-milan 1605 *8 | 50 |
| Hi-milan 1706 *9 | 50 |
| Titanium dioxide | 2 |
| Barium sulfate | 2 |

*8 Hi-milan 1605 (trade name), ethylene-methacrylic acid copolymer ionomer resin obtained by neutralizing with sodium ion, manufactured by Mitsui Du Pont Polychemical Co., Ltd., flexural modulus = 3,010 kgf/cm$^2$, Shore D hardness = 61
*9 Hi-milan 1706 (trade name), ethylene-methacrylic acid copolymer ionomer resin obtained by neutralizing with zinc ion, manufactured by Mitsui Du Pont Polychemical Co., Ltd., flexural modulus = 2,750 kgf/cm$^2$, Shore D hardness = 60

(iv) Production of Golf Balls

The intermediate layers were formed by injection molding the intermediate layer composition prepared in the step (ii) on the cores produced in the step (i), and then the cover formed by injection molding the cover composition prepared in the step (iii) on the intermediate layer. Then, a paint was applied on the cover to produce each golf ball having a diameter of 42.75 mm.

An intermediate layer hardness was determined by measuring a surface hardness of a sample with a JIS-C hardness meter, using an article formed by injection molding the intermediate layer composition on the core during the production of the golf ball, as the sample, which had been stored at 23° C. for 2 weeks. The intermediate layer hardness determined as described above is shown in Table 4 and Table 5, together with physical properties of golf balls. A thickness of the intermediate layers was 1.85 mm.

The weight, compression, flight distance, durability and shot feel of the resulting golf balls were measured or evaluated, and the results are shown in Table 4 and Table 5. The test methods are as follows.

Test Method (1) Compression

Compression was determined by measuring a deformation amount when applying an initial load of 10 Kg to a final load of 130 Kg on the golf ball.

(2) Flight performance

A No. 1 wood club was mounted to a swing robot manufactured by True Temper Co. and a golf ball was hit at a head speed of 45 m/second. Flight distance is measured. As the flight distance, carry which is a distance from a hit point to the first dropping point on the ground of the hit golf ball is measured.

(3) Durability

A golf ball was hit by a No. 1 wood club, repeatedly. The durability is the number of hit until the golf tall cracks, and is indicated by an index when that of Comparative Example 1 being 100.

(4) Shot feel

The shot feel of the golf ball is evaluated by 10 top professional golfers according to a practical hitting test using a No. 1 wood club. The evaluation criteria are as follows. The results shown in the Tables below are based on the fact that not less than 8 out of 10 top professional golfers evaluated with the same criterion about shot feel.

Evaluation Criteria:

⊚: Good

○: Fairly good x: Poor

The results are shown in Table 4 and Table 5, together with the kind and hardness difference of the core, and the kind and hardness of the intermediate layer of Examples and Comparative Examples. The kind of core is represented by a symbol of core composition (A to B) shown in Table 1, and the kind of intermediate layer is represernted by a numeral of intermediate layer composition (I to VI) shown in Table 2.

TABLE 4

| Example No. | 1 | 2 | 3 | 4 |
|---|---|---|---|---|
| (Core) | | | | |
| Kind | A | A | A | A |
| JIS-C Hardness difference | 12 | 12 | 12 | 12 |
| (Intermediate layer) | | | | |
| Kind | I | II | III | IV |
| JIS-C hardness | 60 | 70 | 65 | 45 |
| (Physical properties of golf ball) | | | | |
| Weight (g) | 45.4 | 45.4 | 45.4 | 45.4 |
| Compression (mm) | 2.75 | 2.85 | 2.80 | 2.95 |
| Flight performance | 231 | 230 | 230 | 229 |
| Durability | 130 | 125 | 130 | 125 |
| Shot feel | ⊚ | ⊚ | ⊚ | ⊚ |

TABLE 5

| Comparative Example No. | 1 | 2 | 3 |
|---|---|---|---|
| (Core) | | | |
| Kind | B | A | A |
| JIS-C Hardness difference | 20 | 12 | 12 |
| (Intermediate layer) | | | |
| Kind | I | V | VI |
| JIS-C hardness | 60 | 85 | 30 |

TABLE 5-continued

| Comparative Example No. | 1 | 2 | 3 |
|---|---|---|---|
| (Physical properties of golf ball) | | | |
| Weight (g) | 45.4 | 45.4 | 45.4 |
| Compression (mm) | 3.00 | 2.60 | 3.22 |
| Flight performance | 222 | 221 | 221 |
| Durability | 100 | 130 | 95 |
| Shot feel | ○ | x | x |

As is apparent from the comparison of the physical properties of the golf balls of Examples 1 to 4 shown in Table 4 with those of the golf balls of Comparative Examples 1 to 3 shown in Table 5, the golf balls of Examples 1 to 4 have longer flight distance and better shot feel.

In detail, the golf ball of Examples 1 to 4 has longer flight distance by 7 to 11 yards, better shot feel and better durability than that of Comparative Example 1.

The golf ball of Examples 1 to 4 has longer flight distance by 8 to 10 yards and better shot feel than that of Comparative Examples 2 to 3.

It is considered that the golf ball of Comparative Example 1 is inferior in flight distance, shot feel and durability to the golf balls of Examples 1 to 4 because the core of the golf ball of Comparative Example 1 has larger hardness difference. It is considered that the golf ball of Comparative Example 2 is inferior in flight distance and shot feel to the golf balls of Examples 1 to 4 because the intermediate layer of the golf ball of Comparative Example 2 has higher hardness. It is considered that the golf ball of Comparative Example 3 is inferior in flight distance, shot feel and durability to the golf balls of Examples 1 to 4 because the intermediate layer of the golf ball of Comparative Example 3 has lower hardness.

What is claimed is:

1. A multi-piece solid golf ball comprising a core, one or more intermediate layers formed on the core, and a cover covering the intermediate layer, wherein at least one of the intermediate layer is mainly composed of a heated mixture comprising at least two materials selected from the following three materials:

(A) ionomer resin,
   (B) thermoplastic elastomer having terminal OH groups, and
   (C) either epoxy-group containing styrene-butadiene-styrene block copolymer or epoxy-group containing styrene-isoprene-styrene block copolymer, and the intermediate layer has a JIS-C hardness of 40 to 80, and the core has a JIS-C hardness difference ranging from its center to the surface of not more than 15.

2. The multi-piece solid golf ball according to claim 1, wherein the cover is mainly formed from ionomer resin.

* * * * *